(12) United States Patent
Wang et al.

(10) Patent No.: US 10,687,108 B2
(45) Date of Patent: Jun. 16, 2020

(54) PROGRAM RECORDING METHOD AND TERMINAL

(71) Applicants: Qingdao Hisense Electronics Co., Ltd., Qingdao (CN); HISENSE USA CORPORATION, Suwanee, GA (US); HISENSE INTERNATIONAL CO., LTD., Qingdao (CN)

(72) Inventors: Guilan Wang, Qingdao (CN); Tonglu Zhang, Qingdao (CN)

(73) Assignees: HISENSE VISUAL TECHNOLOGY CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 24 days.

(21) Appl. No.: 15/965,119

(22) Filed: Apr. 27, 2018

(65) Prior Publication Data

US 2018/0249201 A1 Aug. 30, 2018

(30) Foreign Application Priority Data

Apr. 28, 2017 (CN) .......................... 2017 1 0295752
May 15, 2017 (CN) .......................... 2017 1 0340415

(51) Int. Cl.
*H04N 21/433* (2011.01)
*H04N 5/76* (2006.01)
(Continued)

(52) U.S. Cl.
CPC .......... *H04N 21/4334* (2013.01); *H04N 5/76* (2013.01); *H04N 5/7605* (2013.01); *H04N 5/765* (2013.01);
(Continued)

(58) Field of Classification Search
CPC .......... H04N 21/4334; H04N 21/4335; H04N 21/42607; H04N 5/7605; H04N 5/765
(Continued)

(56) References Cited

U.S. PATENT DOCUMENTS 6,744,535 B2 * 6/2004 Chimura ............ H04N 1/00204
358/404
8,533,767 B1 * 9/2013 Tsang ................... H04N 21/251
725/105

(Continued)

FOREIGN PATENT DOCUMENTS

CN 1698351 A 11/2005
CN 1791205 A 6/2006
(Continued)

OTHER PUBLICATIONS

Chinese Office Action dated Mar. 21, 2019 issued in Chinese Patent Application No. 2017102957529, English translation, 17 pages.
(Continued)

*Primary Examiner* — Thai Q Tran
*Assistant Examiner* — Syed Y Hasan
(74) *Attorney, Agent, or Firm* — Knobbe Martens Olson and Bear LLP (57) ABSTRACT

Disclosed are a program recording method and terminal. The method includes: upon receiving a reservation request for a new recording task, determining whether there is an overlapping third recording time period between a first recording time period for a previously reserved recording task in a target CAM card and a second recording time period for a new recording task; if the overlapping third recording time period exists, determining whether a number of data streams supported by the target CAM card is more than that of reserved recording tasks in the target CAM card within the third recording time period; if yes, making a reservation for the new recording task using the target CAM card.

20 Claims, 4 Drawing Sheets

(51) Int. Cl.
*H04N 21/418* (2011.01)
*H04N 21/426* (2011.01)
*H04N 21/4335* (2011.01)
*H04N 5/765* (2006.01)

(52) U.S. Cl.
CPC ..... *H04N 21/4181* (2013.01); *H04N 21/4335* (2013.01); *H04N 21/42607* (2013.01)

(58) Field of Classification Search
USPC .............................................. 386/295; 725/58
See application file for complete search history.

(56) References Cited

U.S. PATENT DOCUMENTS

| | | | | |
|---|---|---|---|---|
| 9,483,667 | B1* | 11/2016 | Roth | ............... G06K 7/0004 |
| 2003/0208763 | A1* | 11/2003 | McElhatten | ......... G06F 3/0482 |
| | | | | 725/58 |
| 2006/0153523 | A1* | 7/2006 | Ishida | ................. G11B 27/034 |
| | | | | 386/295 |
| 2006/0215988 | A1* | 9/2006 | Tol | ...................... G11B 27/034 |
| | | | | 386/292 |
| 2013/0014185 | A1 | 1/2013 | Saraf et al. | |

FOREIGN PATENT DOCUMENTS

| | | |
|---|---|---|
| CN | 1980361 A | 6/2007 |
| CN | 102088632 A | 6/2011 |
| CN | 102271285 A | 12/2011 |
| CN | 102917249 A1 | 2/2013 |

OTHER PUBLICATIONS

The Second Office Action received in CN201710295752.9 dated Oct. 23, 2019.

* cited by examiner

PROGRAM RECORDING METHOD AND TERMINAL

CROSS REFERENCE TO RELATED APPLICATIONS

This application claims the priority of Chinese patent application No. 201710295752.9, filed on Apr. 28, 2017 and the priority of Chinese patent application No. 201710340415.7, filed on May 15, 2017; the entire disclosures of the above applications are incorporated herein by reference.

FIELD

The present disclosure relates to processing recording tasks, and particularly to a media program recording method and terminal for digital television.

BACKGROUND

A Conditional Access Module (CAM) card is a digital video module used for connecting a television set and an external signal source. The CAM card can convert compressed digital signals to television content and display the television content on the television set. The CAM card and a smart card are used cooperatively and inserted into an integrated digital television with a Common Interface (CI), so that a user can directly watch the ordered digital television content without a set top box.

The CAM versions before version CI/CI+1.3 only supported the input and output of a single data stream. In other words, only one transfer stream could enter the CAM card and then be outputted to the host from the CAM card after being processed in the CAM card.

SUMMARY

The present disclosure provides program recording methods and terminals used for solving the problem that previously, during multi-tasks recording, the user could only be informed of whether a program can be recorded when the reservation time for a recording task has arrived.

Embodiments of the present disclosure provide program recording methods. The method can include: upon receiving a reservation request for a new recording task, determining whether there is an overlapping third recording time period between a first recording time period for a previously reserved recording task in a target Conditional Access Module ("CAM") card of the terminal and a second recording time period for the new recording task; in response to determining that there is an overlapping third recording time period between the first recording time period and the second recording time period, determining whether a number of data streams supported by the target CAM card is more than a number of reserved recording tasks in the target CAM card within the third recording time period; and, in response to determining that the number of data streams supported by the target CAM card is more than the number of reserved recording tasks in the target CAM card within the third recording time period, making a reservation for the new recording task using the target CAM card.

The embodiments of the present disclosure further provide a terminal. The terminal can include: a processor; a memory, in communication with the processor for storing instructions executable by the processor. The processor can be configured to execute the instructions to: upon receiving a reservation request for a new recording task, determine whether there is an overlapping third recording time period between a first recording time period for a previously reserved recording task in a target Conditional Access Module ("CAM") card of the terminal and a second recording time period for the new recording task; in response to determining that there is an overlapping third recording time period between the first recording time period and the second recording time period, determine whether a number of data streams supported by the target CAM card is more than that of reserved recording tasks in the target CAM card within the third recording time period; and, in response to determining that the number of data streams supported by the target CAM card is more than that of reserved recording tasks in the target CAM card within the third recording time period, make a reservation for the new recording task using the target CAM card.

The embodiments of the present disclosure further provide a non-transitory computer readable storage medium which is used for storing computer programs, where the execution of the computer programs by a processor causes the processor to perform methods described herein.

DESCRIPTION OF DRAWINGS

To describe the technical solutions in embodiments of the present disclosure more clearly, drawings supporting the description of the embodiments are presented below. The drawings in the following description are merely the illustrations of the present disclosure, and for those having ordinary skilled in the art, other drawings can also be obtained according to the drawings without undue experimentation. In the drawings.

DETAILED DESCRIPTION

To make the purposes, technical solutions, and advantages of the present disclosure more clear, the present disclosure will be further described in detail, in combination with the drawings. The described embodiments are merely part of the embodiments of the present disclosure, not all of the embodiments contemplated. Based on the embodiments in the present disclosure, all other embodiments obtained by those skilled in the art without undue experimentation will fall within the protective scope of the present disclosure.

After CAM cards are updated from version CI+1.3 to version CI+1.4, the CAM cards with version CI+1.4 will support multiple data streams to enter the CAM card simultaneously for completing the descrambling function and then to be output to a host from the CAM card simultaneously, which makes it possible to realize multi-task recording through multiple tuners.

At present, the multi-task recording solution is that the user can make a reservation for recording multiple data streams by the host. The host records the reservation data stream and the reservation time, and starts recording when the reservation time arrives. However, different CAM cards may support different numbers of data streams. If the reservation time for a recording task arrives, and the number of data streams being recorded in the corresponding CAM card is equal to that of data streams supported by the CAM card, then the user will be prompted for failure of reservation for recording.

From the above, presently during multi-task recording, the user can only be informed of whether the program can be recorded at the time of the recording task. In view of this challenge, the present disclosure provides program recording methods and terminals to solve the above problem that, during multi-task recording, the user can only be informed of whether the program can be recorded at the time of the recording task.

Figure 1:
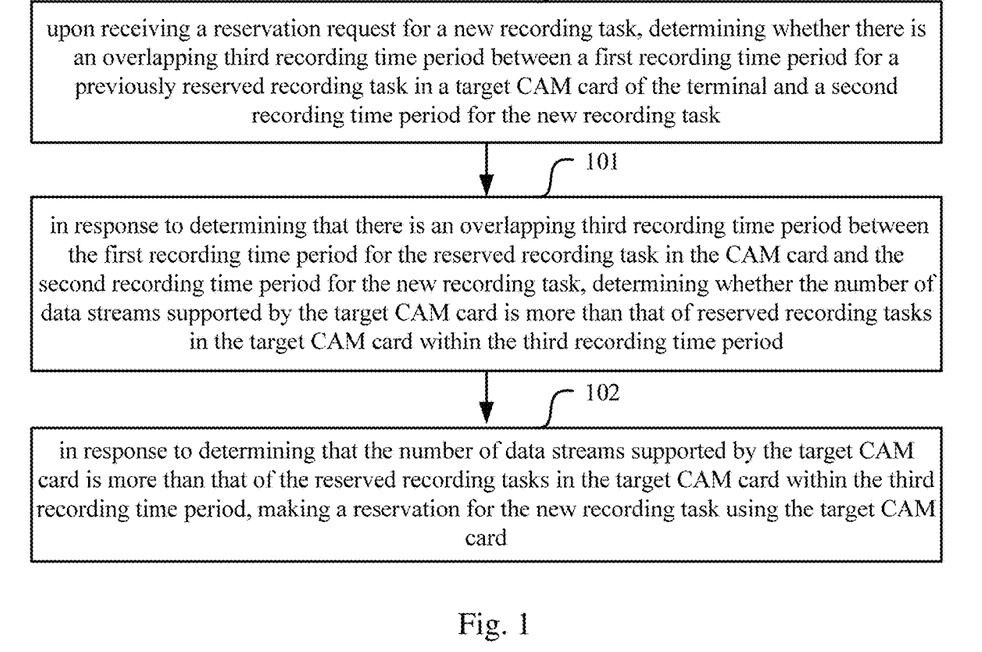
FIG. 1 shows a schematic flow chart of a program recording method according to an embodiment of the present disclosure.

As shown in FIG. 1, the program recording method according to an embodiment of the present disclosure includes:

step 100: upon receiving a reservation request for a new recording task, determining whether there is an overlapping third recording time period between a first recording time period for a previously reserved recording task in a target CAM card of the terminal and a second recording time period for the new recording task;

step 101: in response to determining that there is an overlapping third recording time period between the first recording time period and the second recording time period, determining whether the number of data streams supported by the target CAM card is more than that of reserved recording tasks in the target CAM card within the third recording time period; and step 102: in response to determining that the number of data streams supported by the target CAM card is more than that of the reserved recording tasks in the target CAM card within the third recording time period, making a reservation for the new recording task using the target CAM card.

Here the target CAM card can be a presently inserted CAM card.

In the embodiments of the present disclosure, upon (i) receiving a reservation request for a new recording task, (ii) determining whether there is an overlapping third recording time period between the first recording time period for a previously reserved recording task in the target CAM card and the second recording time period for the new recording task, and (iii) determining whether the number of data streams supported by the target CAM card is more than that of the reserved recording tasks in the target CAM card within the third recording time period, a reservation can be made according to the result of the determination. Whether a recording task can be reserved is determined upon receiving a reservation request for a new recording task, so that the user is informed of whether the program can be recorded while making a reservation, instead of being informed whether the program can be recorded only at the time when one of multi-channel recording is performing.

Several recording time periods involved in the embodiments of the present disclosure will be descried in details below.

One CAM card may allow at least one reserved recording task to perform, and each recording task corresponds to one recording time period.

In some embodiments of the present disclosure, the first recording time period is the recording time period for the previously reserved one or more recording tasks corresponding to the CAM card. If one CAM card has multiple recording tasks reserved on it, the CAM card will correspond to multiple first recording time periods.

For example, if CAM card 1 has recording tasks A and B reserved, the recording time period for the recording task A is 7:00 to 8:00, and the recording time period for the recording task B is 7:30 to 10:00, then CAM card 1 corresponds to two first recording time periods: 7:00 to 8:00 and 7:30 to 10:00.

In some embodiments of the present disclosure, the second recording time period is the recording time period corresponding to a new recording task. For example, if the recording time period for the received new recording task is 7:50 to 11:00, then the second recording time period is 7:50 to 11:00.

Further, if there is an overlapping time period between the recording time period for the reserved recording task in the CAM card and the recording time period for a new recording task, the overlapping time period is called the third recording time period.

For example, if CAM card 1 corresponds to the reserved recording tasks A and B, the recording time period for the recording task A is 7:00 to 8:00, the recording time period for the recording task B is 7:30 to 10:00, and the recording time period for a new recording task is 7:50 to 11:00, then the period from 7:50 to 8:00 is an overlapping time period, and the period from 8:00 to 10:00 is also an overlapping time period, and then CAM card 1 corresponds to two third recording time periods: 7:50 to 8:00 and 8:00 to 10:00.

Figure 2:
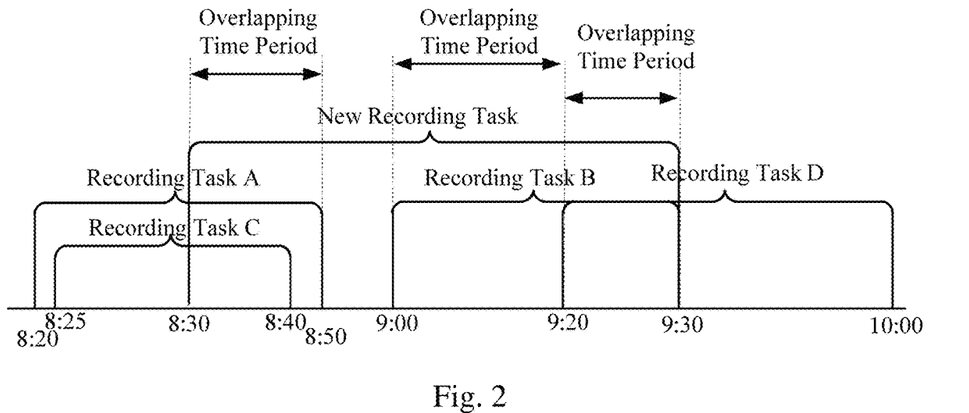
FIG. 2 shows a schematic diagram illustrating the overlapping of the recording tasks according to an embodiment of the present disclosure.

As illustrated in FIG. 2, CAM card 1 corresponds to the reserved recording tasks A, B, C and D, where the recording time period for the recording task A is 8:20 to 8:50, the recording time period for the recording task B is 9:00 to 9:30, the recording time period for the recording task C is 8:25 to 8:40, and the recording time period for the recording task D is 9:20 to 10:00.

Assuming the recording time period for a new recording task is 8:30 to 9:30, the overlapping time periods are 8:30 to 8:40, 8:40 to 8:50, 9:00 to 9:20 and 9:20 to 9:30. Accordingly, the CAM card corresponds to four third recording time periods: 8:30 to 8:40, 8:40 to 8:50, 9:00 to 9:20 and 9:20 to 9:30.

In one or more embodiments, the recording program identification and the recording time period are obtained according to the new recording task.

The corresponding service provider is determined according to the program identification, thereby to determine a CAM card which is supported by the service provider from the inserted CAM cards, and then the determined CAM card is set as a candidate CAM card for a new recording task.

One service provider can serve various CAM cards, i.e., various CAM cards can be supported by the same service provider; one CAM card can correspond to multiple operators, i.e., one CAM card can be supported by multiple service providers.

In some embodiments of the present disclosure, firstly, it needs to determine whether there is an overlapping time period between the recording time period corresponding to a new recording task and the recording time period corresponding to the previously reserved recording task in the target CAM card.

In response to determining that there is no overlapping third recording time period between the first recording time period for the reserved recording task in the target CAM card and the second recording time period for the new recording task, a reservation is made for the new recording task by the target CAM card, and a notification is provided to the user to indicate that the reservation is made successfully.

If there is an overlapping third recording time period between the first recording time period for the reserved recording task in the target CAM card and the second recording time period for the new recording task, it further needs to determine whether the number of data streams supported by the target CAM card is more than that of reserved recording tasks in the target CAM card within the third recording time period.

In response to determining that the number of data streams supported by the target CAM card is more than that of reserved recording tasks in the target CAM card within the third recording time period, reservation is made for the new recording task by the target CAM card; in response to determining that the number of data streams supported by the target CAM card is not more than that of reserved recording tasks in the target CAM card within the third recording time period, a prompt message is sent to the user to indicate that the reservation request for the new recording task is rejected.

In one or more embodiments, there are multiple inserted CAM cards, and if the number of data streams supported by the target CAM card is not more than that of reserved recording tasks corresponding to the third recording time periods in the target CAM card, it needs to further determine whether there is an alternative, candidate CAM card other than the target CAM card in the inserted CAM cards.

In response to determining that there is no candidate CAM card among the inserted CAM cards other than the target CAM card, a prompt message is sent to the user to indicate that the reservation request for the new recording task is rejected.

In response to determining that there is a candidate CAM card(s) among inserted CAM cards other than the target CAM card, one candidate CAM cards is selected from the inserted CAM cards as a new target CAM card.

Further, it is determined whether there is an overlapping third recording time period between the first recording time period for a previously reserved recording task in the new target CAM card and the second recording time period for the new recording task.

In response to determining that there is an overlapping third recording time period between the first recording time period for the reserved recording task in the new target CAM card and the second recording time period for the new recording task, it further needs to determine whether the number of data streams supported by the new target CAM card is more than that of reserved recording tasks in the new target CAM card within the third recording time period.

In response to determining that the number of data streams supported by the new target CAM card is more than that of reserved recording tasks in the new target CAM card within the third recording time period, reservation is made for the new recording task by the new target CAM card; in response to determining that the number of data streams supported by the new target CAM card is not more than that of reserved recording tasks in the new target CAM card within the third recording time period, it further needs to determine whether there is another alternative candidate CAM card which has not yet been selected.

In response to determining that there are candidate CAM cards which have not yet been selected, then it returns to the operation of selecting one CAM card from the candidate CAM cards; in response to determining that there is no candidate CAM card which has not yet been selected, a prompt message indicating that the reservation request for the new recording task is rejected is sent.

In response to determining that there is no overlapping third recording time period between the first recording time period for the reserved recording task in the new target CAM card and the second recording time period for the new recording task, reservation is made for the new recording task by the new target CAM card.

That is to say, each of the candidate CAM cards is judged one by one; if one candidate CAM card can be used for making a reservation, other candidate CAM cards will not be judged at this time; if none of the candidate CAM cards can not be used for making a reservation, a prompt message indicating a rejection of the reservation request for the new recording task is sent.

The candidate CAM cards that can be used for making a reservation shall meet one of the following conditions:

there is no overlapping third recording time period between the first recording time period for the reserved recording task in the candidate CAM card and the second recording time period for the new recording task;

there is an overlapping third recording time period between the first recording time period for the reserved recording task in the candidate CAM card and the second recording time period for the new recording task, but the number of data streams supported by the selected candidate CAM card is more than that of reserved recording tasks in the selected candidate CAM card within the third recording time period.

Optionally, in some embodiments of the present disclosure, upon detecting a CAM card being inserted, the number of data streams supported by the inserted CAM card is determined.

The number of data streams supported by a CAM card means the number of Transport Streams ("TS's") which can be simultaneously input to the CAM card, i.e. the maximum number of TS's which can be simultaneously received by the CAM card.

To make a better judgment, in some embodiments of the present disclosure, multiple tables are set and stored, and are used for search and judgment as required.

All the tables are respectively described below.

1. Module Information Table

When an inserted CAM card is detected, the related attributes of the CAM card are obtained and stored in the attribute table.

The related attributes of the CAM card include but not limited to part or all of the following information:

Card number, whether multi-channel data stream is supported, and number of data streams supported.

The Module Information Table has various forms. An example is shown as Table 1.

TABLE 1

| Serial Number | Whether a CAM card is inserted | Card Number | Whether multi-channel data stream is supported | Number of Data streams Supported |
| --- | --- | --- | --- | --- |
| — | — | — | — | — |

The serial number is a sequence number, and each serial number corresponds to one record.

The card number is used for identifying the CAM card, and each CAM card corresponds to one card number.

It should be noted that Table 1 is only for illustration, and other table forms can be applied to other embodiments of the present disclosure.

When a CAM card is inserted, the related attributes of the CAM card are obtained, and Table 1 is updated according to the obtained related attributes.

When a CAM card is removed, the removed CAM card is determined, and Table 1 is updated. There are various update modes, such as directly deleting the information related to the removed CAM card, or in the table setting the option corresponding to the removed CAM card that "Whether a CAM card is inserted" to "No CAM Card Inserted". In this way, the CAM card is neglected during judgment, and once the corresponding CAM card is inserted again, the option that "Whether a CAM card is inserted" is set to "CAM Card Inserted".

2. Reservation Task Table

The table is used for recording all the reservation tasks.

The Reservation Task Table has various forms, an example is shown as Table 2.

TABLE 2

| Serial Number | Reservation Task Identification | Start Time | End Time | Card Number |
|---|---|---|---|---|
| — | — | — | — | — |

The serial number is a sequence number, and each serial number corresponds to one record.

The reservation task identification is used for uniquely identifying the program to be reserved, and the ID number corresponding to the program is obtained from the data stream.

The card number is used for uniquely identifying one CAM card.

When a reservation is made according to a new recording task, a new reservation message is generated according to the new recording task, and added into Table 2. Subsequently, the related information is obtained directly from Table 2 during judgment.

It should be noted that Table 2 is only for illustration, and other table forms are applied to other embodiments of the present disclosure.

Assuming that there are two reservation tasks, the time periods are respectively 8:20 to 8:50 and 9:00 to 9:30, and the program identifications are respectively 1001 and 1002, the Reservation Task Table is shown as Table 3.

TABLE 3

| Serial Number | Reservation Task Identification | Start Time | End Time | Card Number |
|---|---|---|---|---|
| 1 | 1001 | 8:20 | 8:50 | |
| 2 | 1002 | 9:00 | 9:30 | |

One embodiment of the present disclosure is described below in combination with a detailed example.

Assuming that the reservation tasks in the CAM card A in the Reservation Task Table are shown in Table 4:

TABLE 4

| Serial Number | Reservation Task Identification | Start Time | End Time | Card Number |
|---|---|---|---|---|
| 1 | 1001 | 8:20 | 8:50 | |
| 2 | 1002 | 9:00 | 9:30 | |
| 3 | 1003 | 8:25 | 8:40 | |
| 4 | 1004 | 9:20 | 10:00 | |

Task 1005 is ready for reservation at present, and the start time is 8:30 to 9:30. Four third recording time periods are included:

third recording time period 1: 8:30 to 8:40, during which task 1005 is overlapped with task 1001 and task 1003;

third recording time period 2: 8:40 to 8:50, during which task 1005 is overlapped with task 1001;

third recording time period 3: 9:00 to 9:20, during which task 1005 is overlapped with task 1002;

third recording time period 4: 9:20 to 9:30, during which task 1005 is overlapped with task 1002 and task 1004.

If the target CAM card A used for a new recording task supports at most two data streams, task 1005 cannot be reserved, because the number of the target programs assigned to the CAM card A is equal to the maximum number of data streams supported by the CAM card within the third recording time period 1 and the third recording time period 4, and the user is prompted for reservation failure and/or failure reasons.

If the target CAM card A used for a new recording task supports at most three data streams, task 1005 can be reserved because the number of the target programs assigned to the CAM card A is less than the maximum number of data streams supported by the CAM card within the third recording time period 1 to the third recording time period 4.

Optionally, if there are multiple reserved recording tasks, all tasks overlapped with the new recording task in time can be found, and the period of time during which the overlapping number is maximum can be found.

An Overlapping Task Table is generated based on the above information. The Overlapping Task Table has various forms, an example is shown as Table 5.

TABLE 5

| Serial Number | Time Period 1 | Overlapping Number in Time Period 1 | Time Period 2 | Overlapping Number in Time Period 2 | Time Period 3 ... |
|---|---|---|---|---|---|
| | 1001/1003 | 2 | 1002/1004 | 2 | |

The Overlapping Task Table can be used for judgment, and can be displayed to the user to enable the user to adjust the reserved recording tasks.

It should be noted that the above tables are only for convenience of search. In one or more embodiment, the above information is shown in the table form or other forms such as in a database. In addition, the information may not be stored, but obtained from each CAM card during search.

The reserved program recording terminal according to some embodiments of the present disclosure is a television, a set top box, a mobile display terminal and other terminals into which a CAM card can be inserted.

In the particularly described embodiment, a candidate CAM card is used as a target CAM card, and one candidate card is selected each time and whether the selected candidate card can be used for reservation should be determined; if yes, selection is not continued; otherwise, selection is continued. The specific process is shown in FIG. 3.

Figure 3:
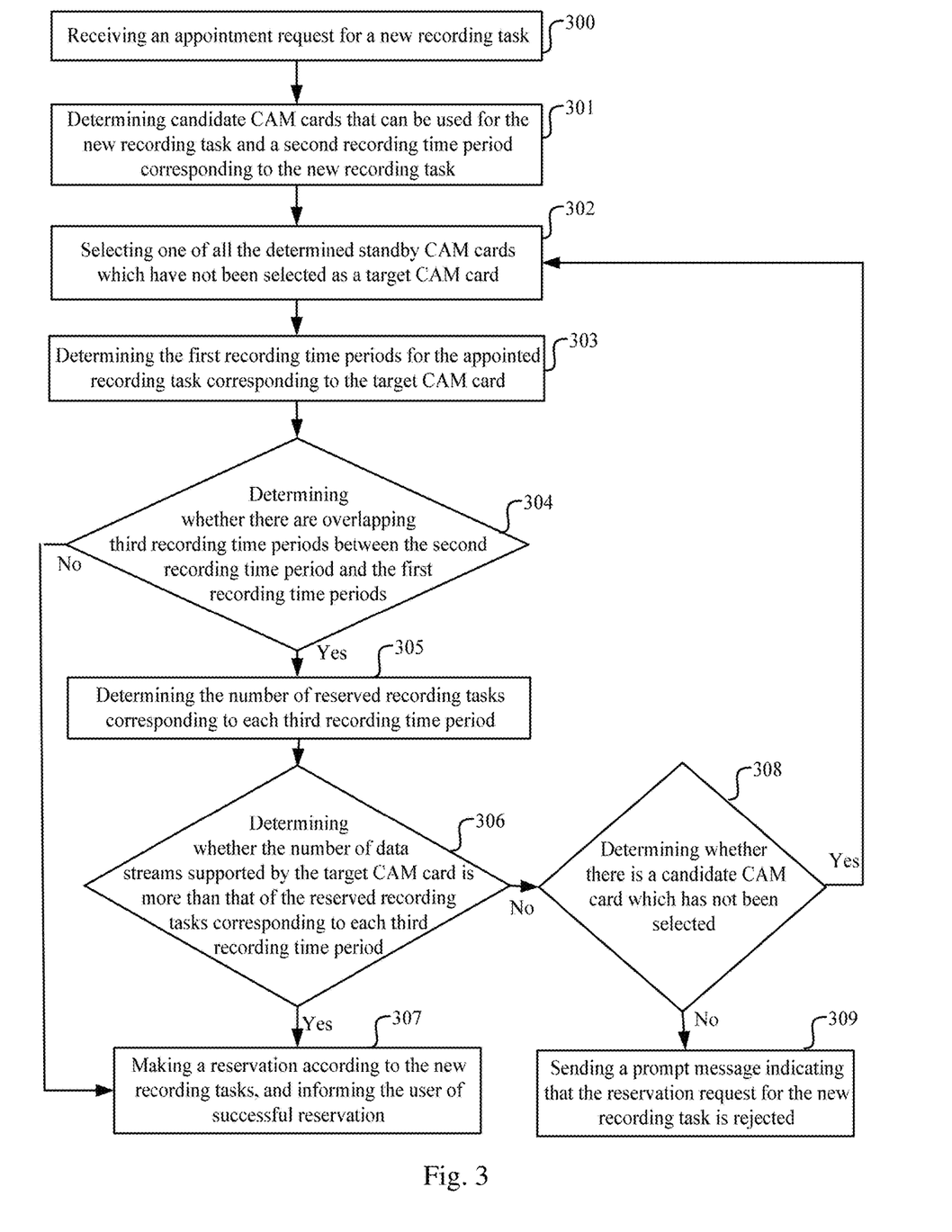
FIG. 3 shows a schematic flow chart of a program recording method according to another embodiment of the present disclosure.

As illustrated in FIG. 3, the program recording method provided in some embodiments of the present disclosure includes:

step 300: receiving a reservation request for a new recording task;

step 301: determining candidate CAM cards that can be used for the new recording task and a second recording time period corresponding to the new recording task;

here, the candidate CAM cards that can be used for the new recording task are CAM cards in which the programs corresponding to the recording task can be decrypted:

step 302: selecting one of all the determined candidate CAM cards which have not been selected as a target CAM card;

step 303: determining the first recording time periods for the reserved recording task in the target CAM card;

step 304: determining whether there are overlapping third recording time periods between the second recording time period and the first recording time periods; in response to determining that there is an overlapping third recording time period between the second recording time period and the first recording time period, going to step 305; in response to determining that there is no overlapping third recording time period between the second recording time period and the first recording time period, going to step 307;

step 305: determining the number of reserved recording tasks corresponding to each third recording time period;

step 306: determining whether the number of data streams supported by the target CAM card is more than that of the reserved recording tasks corresponding to each third recording time period; in response to determining that the number of data streams supported by the target CAM card is more than that of the reserved recording tasks corresponding to each third recording time period, going to step 307; in response to determining that the number of data streams supported by the target CAM card is not more than that of the reserved recording tasks corresponding to each third recording time period, going to step 308;

step 307: making a reservation according to the new recording task, and informing the user of successful reservation;

step 308: determining whether there is a candidate CAM card which has not been selected; in response to determining that there is a candidate CAM card(s) which has not been selected, going to step 302; in response to determining that there is no candidate CAM card which has not been selected, going to step 309;

step 309: sending a prompt message indicating that the reservation request for the new recording task is rejected.

At present, during program recording, a disk is generally selected for storing recording tasks. If the remaining space of each disk in the recording terminal is smaller than the space required for recording, even though the sum of the remaining space of multiple disks in the recording terminal may be larger than the space required for program recording at this moment, the recording operation cannot be executed, which results in problems of low disk space utilization rate and poor user experience.

Figure 4:
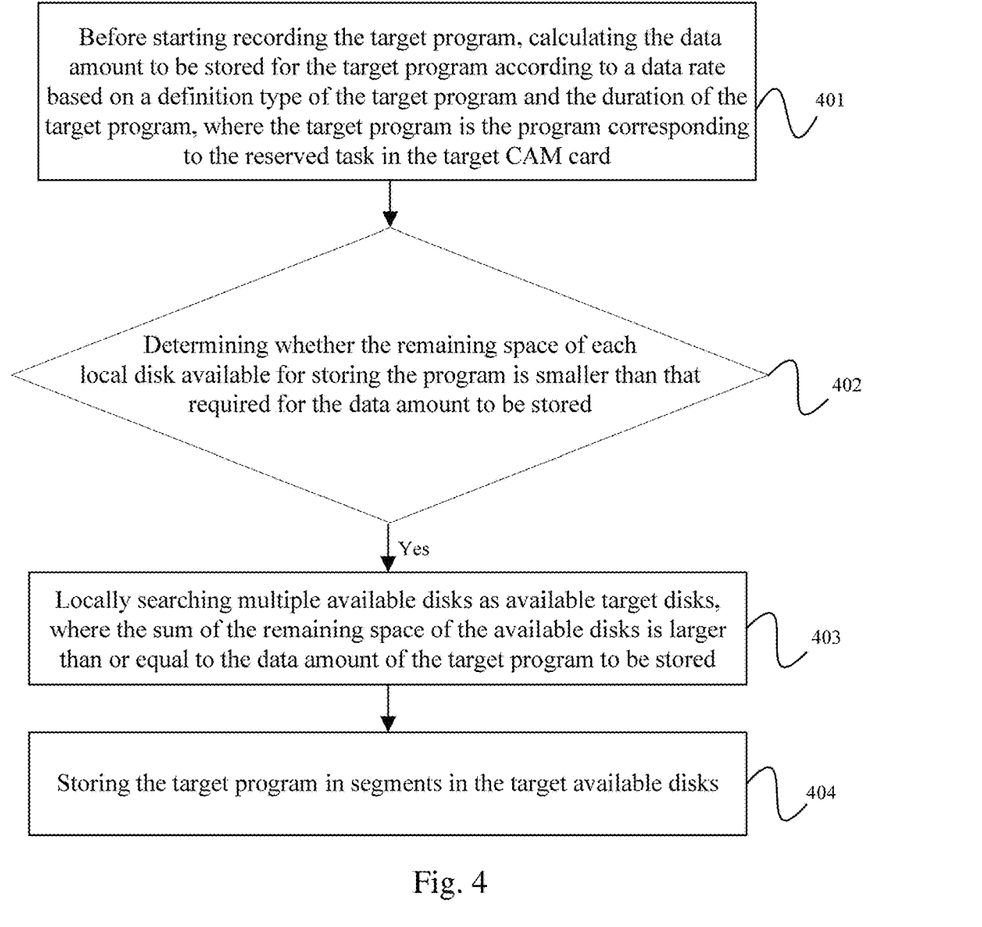
FIG. 4 shows a schematic flow chart of a target program recording method according to an embodiment of the present disclosure.

Optionally, to improve the disk space utilization rate and user experience, as shown in FIG. 4, in some embodiments of the present disclosure, after the new recording task is reserved through the target CAM card, the method further includes:

step 401: before starting recording the target program, calculating the data amount to be stored for the target program according to a data rate based on a definition type of the target program and the duration of the target program, where the target program is the program corresponding to the reserved task in the target CAM card.

The definition type of the target program in the embodiment includes any of definition types established in the related art, such as standard definition, high definition, ultra high definition, etc.

Optionally, in some embodiments, the data amount to be stored of the target program is determined according to the expression below:

$$\text{Data Amount To Be Stored} = \text{Data Rate of Target Program} * \text{Duration of Target Program} \quad \text{formula (1)}$$

Where the symbol * denotes a mathematical multiplication; the duration of the target program involved in the above formula is the recording duration of the target program, and is set by the user or obtained from the television station by the program recording terminal. For example, when the target program is a program broadcast by some television station, the program recording terminal searches and acquires the play time of the target program, i.e., recording duration, from the program playback guide provided by the television station.

The data rate involved in the above expression is acquired with different methods in different scenarios. The method for acquiring the data rate is described below with a smart television as an example in combination with different embodiments.

In an optional embodiment, the smart television stores the data rate of the channel for broadcasting the target program. Because the definition type of the same channel will not change under normal conditions, the data rates of the program broadcast in the same channel are the same under normal conditions. Based on this, in some embodiments, before the data amount to be stored from the target channel is calculated, the data rate of the channel for broadcasting the target program is measured locally, and then configured as the data rate of the target program. Where the data rate of the channel can be determined according to the data amount of the data stream obtained within the preset duration when the smart television historically broadcasts other programs of the channel. For example, the data amount of the data stream received within one second is used as the data rate of the channel, or the data amount of the data stream received per second is calculated according the data amount of the data stream received within five seconds, and used as the data rate of the channel. Alternatively, the data rate of the channel can be preset by those skilled in the art and stored in the smart television.

Optionally, to ensure the reliability of the stored data rate, the smart television regularly updates the broadcasting data rate stored locally, and the updating method is similar to the method for determining the broadcasting data rate of the target channel, which will be not repeated herein.

In another optional embodiment, the smart television does not store the data rate of the channel for broadcasting the target program, but stores the broadcasting data rate of at least one reference channel. The reference channels are the channels which are historically broadcast by the smart television and have the same definition type (such as standard definition, high definition, ultra high definition, etc.) as the channel for broadcasting the target program. The method for determining the data rate of the reference channels is the same as the method for determining the data rate in the above scenarios, which will not be repeated herein. In this scenario, the data rate of the target program is determined according to the average value of the broadcasting data rates of the reference channels. For example, the reference channels with the same definition type as the target channel are a reference channel A, a reference channel B and a reference channel C, where the data rate of the reference channel A is a, the data rate of the reference channel B is b, the data rate of the reference channel C is c, and the data rate of the target program can be determined to be the average value of a, b and c, or the product of the average value of a, b and c and an error coefficient which can be set according to the specific needs.

Step 402 is further included in the method. In step 402 the method further includes: determining whether the remaining space of each local disk available for storing the program is smaller than that required for the data amount to be stored. In response to determining that the remaining space of each local disk available for storing the program is smaller than that required for the data amount to be stored, the method proceeds to step 403.

In some embodiments, the program recording terminal is provided with one or a plurality of hard disks and/or USB flash disks, and each hard disk and/or USB flash disk contains multiple disks.

Step 403 is further included in the method. In step 403 the method further includes: locally searching multiple available disks as target available disks, where the sum of the remaining space of the available disks is larger than or equal to that required for the data amount of the target program to be stored.

When the remaining space of each available disk in the program recording terminal is smaller than that required for the data amount to be stored of the target program, it is possible that the sum of the remaining space of multiple available disks in the program recording terminal is larger than that required for the data amount to be stored of the target program. In this case, in the embodiment, in response to determining that no local disk available for storing the target program exists, multiple disks, the sum of the remaining space of which is larger than the data amount of the target programs, are locally searched, and when the multiple disks with sufficient cumulative space are found, the target programs are stored in segments in the disks to improve the disk space utilization rate and user experience.

Furthermore, there are various approaches for searching the above disks.

In an optional embodiment, local disks are searched first to find an assembly of disks with sufficient space, and a disk assembly containing the fewest number of disks with sufficient space is selected. The assembly of multiple disks can then be treated as the target available disk for storing the target program.

In another optional embodiment, an available disk is selected from the local disks as a basic disk firstly, then the number of available disks is increased one by one, the sum of the remaining storage space of the added available disks and the basic disk is calculated until the sum of the remaining storage space of multiple available disks is larger than or equal to that required for the data amount to be stored of the target program, and the available disks of which the sum of the remaining storage space is larger than or equal to that required for the data amount to be stored of the target program are used as the target available disks. In this approach, to reduce the number of the target available disks, available disks with larger remaining storage space are selected, until the sum of the remaining storage space of the available disks is larger than or equal to the data amount of the target program.

In another optional embodiment, multiple available disks whose remaining space is larger than a preset threshold are selected as the target available disks, such that the sum of the remaining space is larger than or equal to that required for the data amount to be stored for the target program.

In another optional embodiment, multiple available disks that are located in the same hard disk or USB flash disk are preferably selected as the target available disks, such that the sum of the remaining space is larger than or equal to that required for the data amount to be stored for the target program. The method according to this embodiment can facilitate acquiring and watching the recorded programs at a later stage.

In practical application, the available disks for storing the target program can be searched by any of the above methods, and the available disks can also be searched in a combination of the above methods, which is not limited in the embodiment.

Step 404 is further included in the method. In step 404 the method further includes: storing the target program in segments in the target available disks.

In some embodiments of the present disclosure, the storage strategies for the target program are as follows.

Figure 5:
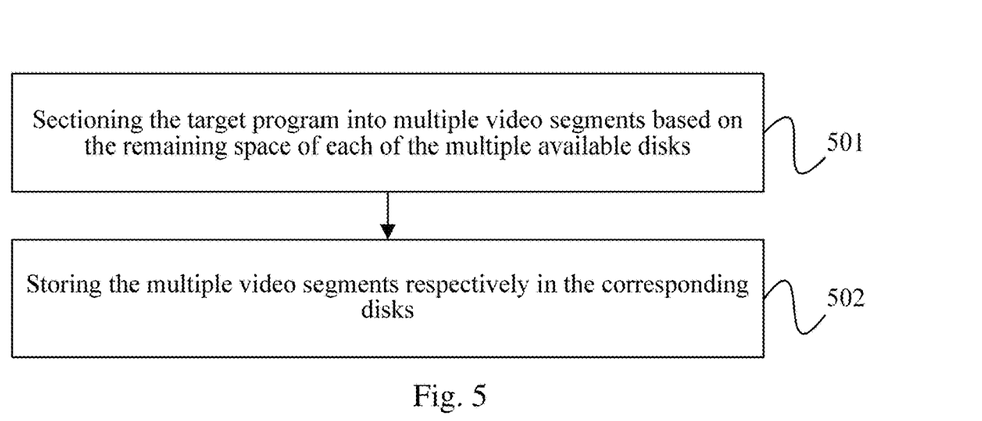
FIG. 5 shows a schematic flow chart of the implementation of step 404 in FIG. 4 according to an embodiment of the present disclosure.

In an optional storage mode, the target program is sectioned in the recording time, and video segments obtained are respectively stored in the corresponding disks. FIG. 5 shows a flow chart of the implementing method of step 404 according to an embodiment of the present disclosure, where step 404 includes the following sub-steps:

step 501: sectioning the target program into multiple video segments according to the remaining space of each of the multiple available disks.

step 502: storing the multiple video segments respectively in the corresponding disks.

For example, if the target disk assembly includes a disk E and a disk F, the remaining space of the disk E is 2 Gb, and the remaining space of the disk F is 1 Gb, the space required for recording the target program is 2.5 Gb, and the recording time period is 5 minutes, then 0.5 Gb of data can be recorded within 1 minute, and 2 Gb of data can be recorded within 4 minutes. Accordingly, the target program is sectioned in time in advance, the first four minutes for recording the target program by the disk E is set, and then the last one minute for recording the target program by the disk F is set. Of course, this is only for demonstration rather than the only embodiment to the present invention.

In another implemented storage mode, the target program is not sectioned in the recording time, but is preferably stored in the disk with the largest remaining space according to the size of the remaining space of each of the multiple searched available disks. When the remaining space of the disk is filled up or is the preset space, the remaining part of the target program is successively stored in the disk with the second-largest remaining space and so on until the recording task is completed. The method can facilitate acquiring and watching the recorded programs at later stage.

In some embodiments of the present disclosure, when the remaining space of each local disk is smaller than the data amount of the target program, multiple disks of which the sum of the remaining space is larger than or equal to the data amount of the target program are locally searched, and the target video is stored in segments in the multiple disks, so that the problem that the program cannot be recorded due to insufficient remaining space of a single disk during program recording is solved, which effectively improves the disk space utilization rate and user experience.

On the basis of the same inventive concept, some embodiments of the present disclosure further provide a program recording terminal. Because the principle of solving the problem used by the terminal is similar to the program recording method of some embodiments of the present disclosure, the implementation of the terminal refers to the implementation of the method, which will not be repeated again.

Figure 6:
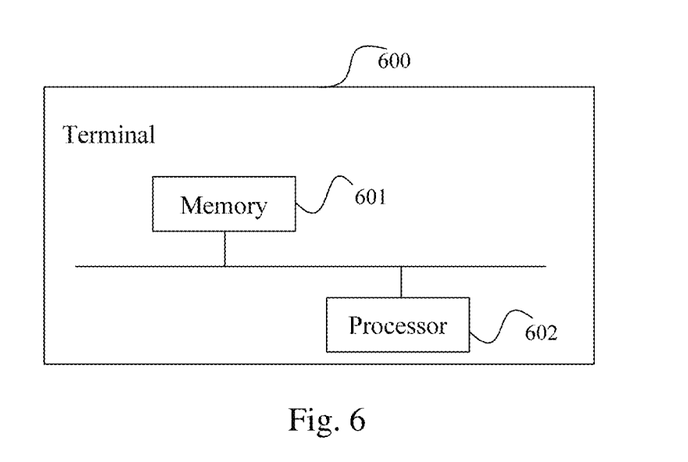
FIG. 6 shows a schematic structural diagram of a terminal according to an embodiment of the present disclosure.

As shown in FIG. 6, some embodiments of the present disclosure provide a terminal, and the terminal 600 includes: a memory 601; and a processor 602. Here, the memory 601 is in communication with the processor 602 for storing instructions executable by the processor; where the processor is configured to execute the instructions to:

upon receiving a reservation request for a new recording task, determine whether there is an overlapping third recording time period between a first recording time period for a previously reserved recording task in a target CAM card of the terminal and a second recording time period for the new recording task;

in response to determining that there is an overlapping third recording time period between the first recording time period for the reserved recording task in the CAM card and the second recording time period for a new recording task, determine whether the number of data streams supported by the target CAM card is more than that of reserved recording tasks in the target CAM card within the third recording time period; and in response to determining that the number of data streams supported by the target CAM card is more than that of the reserved recording tasks in the target CAM card within the third recording time period, make a reservation for the new recording task by the target CAM card.

The target CAM card can be a presently inserted CAM card.

Optionally, after determining whether there is an overlapping third recording time period exists between the first recording time period for the reserved recording task in the CAM card and the second recording time period for a new recording task, the processor 602 is further configured to execute the instructions to:

in response to determining that there is no overlapping third recording time period, make a reservation for the new recording task using the target CAM card.

Optionally, in response to determining that the number of data streams supported by the target CAM card is not more than that of the reserved recording tasks corresponding to the third recording time period for the target CAM card, the processor 602 is further configured to execute the instructions to:

send a prompt message indicating that the reservation request for the new recording task is rejected; or check whether there is a candidate CAM card which has not been selected among the inserted CAM cards other than the target CAM card.

Optionally, after checking whether there is a candidate CAM card which has not been selected among the inserted CAM cards other than the target CAM card, the processor 602 is further configured to execute the instructions to:

in response to determining determined that there is no candidate CAM card which has not been selected among the inserted CAM cards other than the target CAM card, send a prompt message indicating that the reservation request for the new recording task is rejected.

Optionally, after checking whether there is a candidate CAM card which has not been selected among the inserted CAM cards other than the target CAM card, the processor 602 is further configured to execute the instructions to:

in response to determining that there is a candidate CAM card(s) which has not been selected among the inserted CAM cards other than the target CAM card, select one of the candidate CAM cards which have not been selected as a new target CAM card;

determine whether there is an overlapping third recording time period between the first recording time period for the reserved recording task in the new target CAM card and the second recording time period for the new recording task;

in response to determining that there is no overlapping third recording time period between the first recording time period for the reserved recording task in the new target CAM card and the second recording time period for the new recording task, make a reservation for the new recording task using the new target CAM card;

in response to determining that there is an overlapping third recording time period between the first recording time period for the reserved recording task in the new target CAM card and the second recording time period for the new recording task, determine whether the number of data streams supported by the new target CAM card is more than that of reserved recording tasks in the new target CAM card within the third recording time period;

in response to determining that the number of data streams supported by the new target CAM card is more than that of reserved recording tasks in the new target CAM card within the third recording time period, make a reservation for the new recording task using the new target CAM card; in response to determining that the number of data streams supported by the new target CAM card is not more than that of reserved recording tasks in the new target CAM card within the third recording time period, determine whether there is another candidate CAM card which has not been selected;

in response to determining that there is another candidate CAM card which has not been selected, perform the operation of selecting one of the candidate CAM cards as a new target CAM card again; in response to determining that there is no another candidate CAM card which has not been selected, send a prompt message indicating that the reservation request for the new recording task is rejected.

Optionally, the processor 602 is further configured to execute the instructions to:

upon detecting a CAM card being inserted, obtain and saving the number of data streams supported by the inserted CAM card.

The reserved program recording terminal of some embodiments of the present disclosure is a television, a set top box, a mobile display terminal and other terminals which can be inserted with a CAM card.

Optionally, the first recording time period includes one or more time periods corresponding to the reserved recording tasks, and the third recording time period includes one or more time periods corresponding to new recording tasks.

Optionally, after making a reservation for the new recording task using the new target CAM card, the processor 602 is further configured to execute the instructions to:

before starting recording the target program, calculate the data amount to be stored for the target program according to the data rate configured based on the definition type of the target program and the duration of the target program;

under a condition that the remaining space of each local disk available for storing the program is smaller than that required for the data amount to be stored, locally search multiple available disks as target available disks, where the sum of the remaining space of the target available disks is larger than or equal to that required for the data amount to be stored of the target program;

store the target program in segments in the target available disks.

Further, in some embodiments of the disclosure, the data amount to be stored of the target program is determined according to the expression below:

Data Amount To Be Stored=Data rate of Target Program*Duration of Target Program

Where the symbol * denotes a mathematical multiplication; the duration of the target program involved in the above formula is the recording duration of the target program and is set by the user or obtained from the television station by the program recording terminal. For example, when the target program is a program broadcast by a television station, the program recording terminal searches and acquires the play time of the target program, i.e., recording duration, from the program playback guide provided by the television station.

The data rate involved in the above expression is acquired with different methods in different scenarios. The method for acquiring the data rate is described below with a smart television as an example in combination with different embodiments.

In an optional embodiment, the smart television stores the data rate of the channel for broadcasting the target program. Because the definition type of the same channel is constant under normal conditions, the data rate of the program broadcast in the same channel is also constant under normal conditions. Based on this, in some embodiments, before the data amount to be stored of the target channel is calculated, the data rate of the channel for broadcasting the target program is acquired locally, and the data rate of the channel is configured as the data rate of the target program. The data rate of the channel can optionally be determined according to the data amount of the data stream obtained within a preset duration when the smart television receives other programs broadcast on the same channel. For example, the data amount of the data stream received from the same channel within one second is used as the data rate of the channel, or the data amount of the data stream received per second is calculated according the data amount of the data stream received within five seconds, and used as the data rate of the channel. In addition, the data rate of the channel can also be preset and stored in the smart television.

To ensure the reliability of the stored data rate, the smart television regularly updates the broadcasting data rate stored locally, and the updating method is similar to the method for determining the broadcasting data rate of the target channel, which will be not repeated herein.

In another optional embodiment, the smart television does not store the data rate of the channel for broadcasting the target program, but stores the broadcasting data rate of at least one reference channel. The reference channels are channels that are historically broadcast to the smart television and have the same definition type (such as standard definition, high definition, ultra high definition, etc.) as the channel for broadcasting the target program. The method for determining the data rate of the reference channels is the same as the method for determining the data rate in the above scenarios, which will not be repeated herein. In this scenario, the data rate of the target program is determined according to the average value of the broadcasting data rates of the reference channels. For example, the reference channels with the same definition type as the target channel are a reference channel A, a reference channel B and a reference channel C, where the data rate of the reference channel A is a, the data rate of the reference channel B is b, the data rate of the reference channel C is c, and the data rate of the target program can be determined to be the average value of a, b and c, or the product of the average value of a, b and c and an error coefficient which can be set according to the specific needs.

In an optional mode, the processor 602 configured to execute the instructions to locally search multiple available disks as target available disk is configured to:

search all disk assemblies of which the sum of the remaining space is larger than or equal to that required for the data amount to be stored of the target program from the local disks firstly, and select the disk assembly containing the fewest disks among all the disk assemblies as the target available disk. The assembly of multiple disks can then be treated as the target available disk for storing the target program.

In another optional embodiment, the processor 602 configured to execute the instructions to locally search multiple available disks as target available disk is configured to:

select an available disk from the local disks as a basic disk firstly, then increase the number of available disks one by one on the basis of the basic disk, calculate the sum of the remaining storage space of the added available disks and the basic disk until the sum of the remaining storage space of multiple available disks is larger than or equal to that required for the data amount to be stored of the target program, and use the available disks of which the sum of the remaining storage space is larger than or equal to that required for the data amount to be stored of the target program as the target available disks. In this approach, to reduce the number of the target available disks, available disks with larger remaining storage space are selected, until the sum of the remaining storage space of the available disks is larger than or equal to the data amount of the target program.

In another optional embodiment, the processor 602 configured to execute the instructions to locally search multiple available disks as target available disk is configured to:

select multiple available disks whose remaining space is larger than a preset threshold, such that the sum of the remaining space is larger than or equal to that required for the data amount to be stored of the target program.

In another optional embodiment, the processor 602 configured to execute the instructions to locally search multiple available disks as target available disk is configured to:

select multiple available disks that are located in the same hard disk or USB flash disk as the target available disks, such that the sum of the remaining space is larger than or equal to the data amount of the target program. The mode can facilitate acquiring and watching the recorded programs at later stage.

In practical application, the available disks for storing the target programs can be searched by any of the above methods, and the available disks can also be searched in a combination of the above methods, which is not specifically limited in the embodiment.

Optionally, the processor 602 configured to execute the instructions to to store the target program in segments in the target available disks is configured to:

section the target program into multiple video segments according to the remaining space of each of the target disks;

store the multiple video segments respectively in the corresponding disks.

For example, if the target disk assembly includes a disk E and a disk F, the remaining space of the disk E is 2 Gb, and the remaining space of the disk F is 1 Gb, the space required for recording the target program is 2.5 Gb, and the recording time period is 5 minutes, then 0.5 Gb of data can be recorded within 1 minute, and 2 Gb of data can be recorded within 4 minutes. Accordingly, the target program is sectioned in time in advance, the first four minutes for recording the target program by the disk E is set, and then the last one minute for recording the target program by the disk F is set. Of course, this is only for demonstration rather than the only restriction to the present invention.

In another implemented storage mode, the target program is not sectioned in the recording time, but is preferably stored in the disk with the largest remaining space according to the size of the remaining space of each of the multiple searched available disks. When the remaining space of the disk is filled up or is the preset space, the remaining part of the target program is successively stored in the disk with the second-largest remaining space and so on until the recording task is completed. The method can facilitate acquiring and watching the recorded programs at later stage.

Some embodiments of the present disclosure are directed to a non-transitory computer readable storage medium which is used for storing a program for implementing the program recording method of the embodiments of the present disclosure. After the readable storage medium is connected with other terminals, the program in the readable storage medium can be executed by processors in other terminals so as to implement the operations of the program recording method of the present disclosure.

The memory and other terminals can be connected through an external interface or an internal interface. If the memory is a USB flash disk or a mobile hard disk, an external interface is used for connection; if the memory is a storage module in other terminals, an internal interface is used for connection.

The present disclosure is described above by reference to the method, the terminal (system) and/or the block diagram and/or flow chart of the computer program product of the embodiments of the present disclosure. It should be understood that a block of and a combination of blocks of a block diagram and/or flow chart can be realized through computer program instructions. The computer program instructions can be provided for a general computer, a processor of a special-purpose computer and/or other programmable data processing terminals to generate a machine, so that the instructions executed by the computer processor unit and/or other programmable data processing terminals can establish a method used for realizing the functions/actions specified in the block diagram and/or the flow chart block.

Accordingly, the present disclosure can also be implemented through hardware and/or software (including firmware, resident software, microcode, etc.). Furthermore, the present disclosure can take the form of the computer program product in the computer usable or computer readable storage medium, and have the computer usable or computer readable program code realized in the medium to be used by or in combination of an instruction execution system. In the context of the present disclosure, the computer usable or computer readable medium can be any medium, and may include storage, communication, transmission or transfer programs to be used by or in combination of the instruction execution system, terminal or equipment.

Those skilled in the art could implement various modifications to and variations of the present disclosure without departing from the spirit and scope of the present disclosure. So, the present disclosure is intended to include the modifications and variations if the modifications and variations belong to claims of the present disclosure and the equivalent technical scope.

The invention claimed is:

1. A method for processing recording tasks in a terminal, comprising:

upon receiving a reservation request for a new recording task, determining whether there is an overlapping third recording time period between a first recording time period for a previously reserved recording task in a target Conditional Access Module (CAM) card inserted in the terminal and a second recording time period for the new recording task;

in response to determining that there is an overlapping third recording time period between the first recording time period and the second recording time period, further determining whether a maximum number of data streams which the target CAM card is able to process is more than a number of reserved recording tasks in the target CAM card within at least one sub-time period of the third recording time period, wherein the number of reserved recording tasks within the at least one sub-time period of the third recording time period is the amount of previously reserved recording tasks within the third recording time period plus 1;

in response to the maximum number of data streams which the target CAM card is able to process being more than the number of reserved recording tasks in the target CAM card within the at least one sub-time period of the third recording time period, making a reservation for the new recording task using the target CAM card;

in response to the maximum number of data streams which the target CAM card is able to process being not more than the number of the reserved recording tasks in the target CAM card within the at least one sub-time period of the third recording time period, sending a prompt message indicating that the reservation request for the new recording task is rejected during a reservation process.

2. The method of claim 1, wherein the first recording time period includes multiple sub-time periods corresponding to multiple reserved recording tasks, and the third recording time period includes one or more sub-time periods corresponding to the new recording task.

3. The method of claim 1, wherein after determining whether there is an overlapping third recording time period between the first recording time period for the previously reserved recording task in the target CAM card inserted in the terminal and the second recording time period for the new recording task, the method further comprises:

in response to determining that there is no overlapping third recording time period between the first recording time period and the second recording time period, making a reservation for the new recording task using the target CAM card.

4. The method of claim 1, wherein after making the reservation for the new recording task using the target CAM card, the method further comprises:

before starting recording a target program, calculating an amount of data to be stored for the target program according to a data rate based on a definition type of the target program and a duration of the target program, wherein the target program is a program corresponding to the reserved recording task; and in response to a remaining space of each individual local disk available for storing the target program being smaller than space required for the amount of data to be stored, selecting multiple locally available disks as target available disks, such that a sum of remaining space of the target available disks is larger than or equal to the space required for the amount of data to be stored for the target program;

storing the target program in segments in the target available disks.

5. The method of claim 4, wherein the target available disks are selected such that a number of the target available disks is smallest while ensuring that the sum of the remaining space of the target available disks is larger than or equal to the space required for the data amount of the target program to be stored.

6. The method of claim 4, wherein the selecting multiple locally available disks as the target available disks comprises:

increasing a number of selected available disks one by one, and calculating a sum of the remaining storage space of the selected available disks to check whether the sum is larger than or equal to the space required for the amount of data to be stored until the sum of the remaining storage space of the multiple selected available disks is larger than or equal to the space required for the amount of data of the target program to be stored;

using the multiple selected available disks whose sum of the remaining storage space is larger than or equal to the space required for the amount of data to be stored as the target available disks.

7. The method of claim 4, wherein the storing the target program in segments in the target available disks comprises:

dividing the target program into multiple video segments based on the remaining space of each of the target disks;

storing the multiple video segments respectively in the corresponding disks.

8. The method of claim 4 wherein, after making the reservation for the new recording task using the target CAM card and before calculating the amount of data of the target program to be stored according to the data rate based on the definition type of the target program and the duration of the target program, the method further comprises:

for other programs having a same definition type and belonging to a same channel as the target program, determining a current amount of data of data streams currently received for the other programs, and calculating a data rate corresponding to said other programs; using the data rate corresponding to the definition type of the target program according to the data rate corresponding to said other programs when calculating the amount of data to be stored.

9. The method of claim 1, further comprising:

in response to the maximum number of data streams which the target CAM card is able to process being not more than the number of the reserved recording tasks in the target CAM card within the at least one sub-time period of the third recording time period, checking whether there is a candidate CAM card among inserted CAM cards other than the target CAM card which has not been previously selected as a target CAM card.

10. The method of claim 9 further comprising, after checking whether there is a candidate CAM card among inserted CAM cards other than the target CAM card which has not been previously selected as a target CAM card:

in response to determining that there is no candidate CAM card among inserted CAM cards other than the target CAM card which has not been previously selected as a target CAM card, sending a prompt message indicating that the reservation request for the new recording task is rejected during the reservation process;

in response to determining that there is a candidate CAM card among inserted CAM cards other than the target CAM card which has not been previously selected as a target CAM card, selecting one candidate CAM card which has not been selected as a new target CAM card; and determining whether there is an overlapping third recording time period between a first recording time period for a reserved recording task in the new target CAM card and a second recording time period for the new recording task;

in response to determining that there is no overlapping third recording time period between the first recording time period for a reserved recording task in the new target CAM card and the second recording time period for the new recording task, making a reservation for the new recording task using the new target CAM card;

in response to determining that there is an overlapping third recording time period between the first recording time period for the reserved recording task in the new target CAM card and the second recording time period for the new recording task, further determining whether a maximum number of data streams which the new target CAM card is able to process is more than a number of reserved recording tasks in the new target CAM card within at least one sub-time period of the third recording time period;

in response to the maximum number of data streams which the new target CAM card is able to process being more than the number of reserved recording tasks in the new target CAM card within the at least one sub-time period of the third recording time period, making a reservation for the new recording task using the new target CAM card; in response to the maximum number of data streams which the new target CAM card is able to process being not more than the number of reserved recording tasks in the new target CAM card within the at least one sub-time period of the third recording time period, determining whether there is another candidate CAM card which has not been selected;

in response to determining that there is another candidate CAM card which has not been selected, returning to the operation of selecting one of the candidate CAM cards as a new target CAM card; in response to determining that there is no other candidate CAM card which has not been selected, sending a prompt message indicating that the reservation request for the new recording task is rejected during the reservation process.

11. The method of claim 1, further comprising:
upon detecting a CAM card being inserted, obtaining and saving the maximum number of data streams which the inserted CAM card is able to process.

12. A terminal, comprising:
a processor;
a memory, in communication with the processor for storing instructions executable by the processor, wherein the processor is configured to execute the instructions to:
upon receiving a reservation request for a new recording task, determine whether there is an overlapping third recording time period between a first recording time period for a previously reserved recording task in a target Conditional Access Module (CAM), card inserted in the terminal and a second recording time period for the new recording task;
in response to determining that there is an overlapping third recording time period between the first recording time period and the second recording time period, further determine whether a maximum number of data streams which the target CAM card is able to process is more than a number of reserved recording tasks in the target CAM card within at least one sub-time period of the third recording time period, wherein the number of reserved recording tasks within the at least one sub-time period of the third recording time period is the amount of previously reserved recording tasks within the third recording time period plus 1;
in response to the maximum number of data streams which the target CAM card is able to process being more than the number of reserved recording tasks in the target CAM card within the at least one sub-time period of the third recording time period, make a reservation for the new recording task using the target CAM card;
in response to the maximum number of data streams which the target CAM card is able to process being not more than the number of the reserved recording tasks in the target CAM card within the at least one sub-time period of the third recording time period, sending a prompt message indicating that the reservation request for the new recording task is rejected during a reservation process.

13. The terminal of claim 12, wherein the first recording time period includes multiple sub-time periods corresponding to the multiple reserved recording tasks, and the third recording time period includes one or more sub-time periods corresponding to the new recording task.

14. The terminal of claim 12, wherein after determining whether there is an overlapping third recording time period between the first recording time period for the previously reserved recording task in the target CAM card inserted in the terminal and the second recording time period for the new recording task, the processor is further configured to execute the instructions to:
in response to determining that there is no overlapping third recording time period between the first recording time period and the second recording time period, make a reservation for the new recording task using the target CAM card.

15. The terminal of claim 12, wherein after making a reservation for the new recording task using the target CAM card, the processor is further configured to execute the instructions to:
before starting recording a target program, calculate an amount of data to be stored for the target program according to a data rate based on a definition type of the target program and a duration of the target program, wherein the target program is a program corresponding to the reserved task; and
in response to a remaining space of each local disk available for storing the target program being smaller than space required for the amount of data to be stored, select multiple locally available disks as target available disks, such that a sum of remaining space of the target available disks is larger than or equal to the space required for the amount of data to be stored for the target program;
store the target program in segments in the target available disks.

16. The terminal of claim 15, wherein the target available disks are selected such that a number of the target available disks is smallest while ensuring that the sum of the remaining space of the target available disks is larger than or equal to the space required for the data amount of the target program to be stored.

17. The terminal of claim 15, wherein the processor configured to execute the instructions to search multiple locally available disks as the target available disks is configured to:
increase a number of selected available disks one by one, and calculate a sum of the remaining storage space of the selected available disks whose number has been increased to check whether the sum is larger than or equal to the space required for the amount of data to be stored until the sum of the remaining storage space of the multiple selected available disks is larger than or equal to the space required for amount of data to be stored for the target program;
use the multiple selected available disks whose sum of the remaining storage space is larger than or equal to the space required for the amount of data to be stored as the target available disks.

18. The terminal of claim 15, wherein the processor configured to execute the instructions to store the target program in segments in the target available disks is configured to:
divide the target program into multiple video segments based on the remaining space of each of the target disks;
store the multiple video segments respectively in the corresponding disks.

19. The terminal of claim 12, wherein the processor is further configured to execute the instructions to:
in response to the maximum number of data streams which the target CAM card is able to process being not more than the number of the reserved recording tasks in the target CAM card within the at least one sub-time period of the third recording time period,
check whether there is a candidate CAM card among the inserted CAM cards other than the target CAM card which has not been previously selected as a target CAM card.

20. The terminal of claim 19, wherein after checking whether there is a candidate CAM card not selected among the inserted CAM cards other than the target CAM card, the processor is further configured to execute the instructions to:

in response to determining that there is no candidate CAM card other than the target CAM card among the inserted CAM cards which has not been previously selected as a target CAM card, send a prompt message indicating that the reservation request for the new recording task is rejected during the reservation process;

in response to determining that there is a candidate CAM card among the inserted CAM cards other than the target CAM card which has not been previously selected as a target CAM card, select one of the inserted CAM cards which have not been selected as a new target CAM card; and determine whether there is an overlapping third recording time period between the first recording time period for a reserved recording task in the new target CAM card and a second recording time period for the new recording task;

in response to determining that there is no overlapping third recording time period between the first recording time period for a reserved recording task in the new target CAM card and the second recording time period for the new recording task, make a reservation for the new recording task using the new target CAM card;

in response to determining that there is an overlapping third recording time period between the first recording time period for the reserved recording task in the new target CAM card and the second recording time period for the new recording task, further determine whether a maximum number of data streams which the new target CAM card is able to process is more than a number of reserved recording tasks in the new target CAM card within at least one sub-time period of the third recording time period;

in response to the maximum number of data streams which the new target CAM card is able to process being more than the number of reserved recording tasks in the new target CAM card within the at least one sub-time period of the third recording time period, make a reservation for the new recording task using the new target CAM card; in response to the maximum number of data streams which the new target CAM card is able to process being not more than the number of reserved recording tasks in the new target CAM card within the at least one sub-time period of the third recording time period, determine whether there is another candidate CAM card which has not been selected;

in response to determining that there is another candidate CAM card which has not been selected, perform the operation of selecting one CAM card from the candidate CAM cards as a new target CAM card again; in response to determining that there is no another candidate CAM card which has not been selected, send a prompt message indicating that the reservation request for the new recording task is rejected during the reservation process.

\* \* \* \* \*